United States Patent [19]

Sarkissian

[11] Patent Number: 5,191,655
[45] Date of Patent: Mar. 2, 1993

[54] INTERFACE ARRANGEMENT FOR FACILITATING DATA COMMUNICATION BETWEEN A COMPUTER AND PERIPHERALS

[75] Inventor: Haig Sarkissian, Forest Hills, N.Y.

[73] Assignee: Standard Microsystems Corporation, Hauppauge, N.Y.

[21] Appl. No.: 782,911

[22] Filed: Oct. 24, 1991

Related U.S. Application Data

[63] Continuation of Ser. No. 582,015, Jul. 20, 1990, abandoned, which is a continuation of Ser. No. 107,159, Oct. 13, 1987, abandoned.

[51] Int. Cl.[5] .............................................. G06F 3/00
[52] U.S. Cl. ............................. 395/275; 364/DIG. 1; 364/238.3; 364/240.8; 364/284; 364/284.2; 364/284.3
[58] Field of Search ........................... 370/92, 94.1; 340/825.52; 395/200, 275

[56] References Cited

U.S. PATENT DOCUMENTS

| | | | |
|---|---|---|---|
| 3,881,174 | 4/1975 | Barnich | 364/200 |
| 4,249,240 | 2/1981 | Barnich | 364/200 |
| 4,285,037 | 8/1981 | Von Stetten | 364/200 |
| 4,654,654 | 3/1987 | Butler et al. | 340/825.52 |
| 4,698,770 | 10/1987 | Rattan et al. | 364/900 |
| 4,701,908 | 10/1987 | Ikeda | 340/825.52 |
| 4,775,931 | 10/1981 | Dickie et al. | 364/200 |
| 4,796,025 | 1/1989 | Farley et al. | 370/92 |
| 5,107,256 | 4/1992 | Ueno et al. | 340/825.52 |

Primary Examiner—Joseph L. Dixon
Assistant Examiner—Rebecca L. Rudolph
Attorney, Agent, or Firm—Hopgood, Calimafde, Kalil, Blaustein & Judlowe

[57] ABSTRACT

An interface circuit is described for use with a plurality of peripherals or attachments connected in data communication with a central computer. The computer sends data messages, each of which includes the unique addresses of that peripheral to which the particular data message is directed. The peripheral interface contains areas for stripping and then storing addresses from the message received from the computer. If the address matches that of the peripheral, the peripheral acts on the message and responds when necessary to the computer with a message return that includes the address.

1 Claim, 6 Drawing Sheets

INTERFACE ARRANGEMENT FOR FACILITATING DATA COMMUNICATION BETWEEN A COMPUTER AND PERIPHERALS

This application is a continuation of application Ser. No. 582,015, filed Jul. 20, 1990, which is a continuation of application Ser. No. 07/107,159, filed Oct. 13, 1987, both abandoned.

BACKGROUND OF THE INVENTION

The present invention relates generally to digital data communication, and more particularly to an interface for use in facilitating data communication between a computer and a plurality of peripherals.

To increase the utility of digital computers it has become a common practice to connect a central computer to a series of peripherals or attachments, which are typically located remote from the computer in a network configuration. The peripherals are typically a printer, a terminal, a personal computer (PC) and the like, and each includes its own microprocessor. In order for these peripherals to operate, each must be able to communicate with the central computer in accordance with a common data protocol or format established by the computer.

In order for the computer to be able to communicate selectively with the peripherals, each of the peripherals is typically assigned a unique address. Each data stream or message from the computer includes, along with the data directed to the peripheral and sync and parity bits, the address for the peripheral to which the message is intended. After the peripheral has processed or acted on the data transmitted to it in this fashion, the peripheral returns a message to the computer, which includes the address of the peripheral from which the message emanates along with appropriate data and synchronization bits.

To allow the computer to communicate with the peripheral an interface is typically provided for each peripheral to convert the message format received from the computer to a format that can be processed in the peripheral microprocessor. In the known computer peripheral interfaces, the address of the first message frame that is received from the computer is checked to determine if the message is directed to that peripheral; that is, if the address portion of the received message is that of the peripheral. In those cases in which a particular peripheral must respond to (or emulate) multiple addresses, the interface must check the received addresses to all the possible peripheral addresses (typically up to seven). This process requires a not insignificant time.

Moreover, after the conventional attachment determines that the message from the computer is intended for it, and that the peripheral must then respond to the computer, it must provide two bytes of information for every outgoing frame—one byte for data and the second byte for the peripheral address. This is a disadvantage because the microprocessor associated with that peripheral has to save and reproduce the address and perform two write operations for every outgoing frame.

In addition, if the frame of the message from the addressed peripheral to the computer is the last frame in a multi-frame message, the microprocessor in the conventional interface must keep track of the data it is sending to determine that it is sending the last frame, and, instead of sending the peripheral address information it must send the end-of-message delimiter (typically a three-bit address of binary 111 or seven).

In large part owing to these requirements, the conventional peripheral interface circuits have been bulky and expensive, typically consisting of as many as 100 integrated circuits mounted on a board. There is thus a present need for a less expensive and less bulky interface for use in connecting a plurality of different peripherals to a central computer and which still allows the logic of the peripheral to conform to the protocol of the computer.

It is accordingly an object of the present invention to provide an interface of the type described which is less costly and less complex than the presently known peripheral interface circuits.

It is another object of the invention to provide a peripheral interface of the type described which facilitates and speeds up data communication between a peripheral and a computer.

It is a further object of the invention to provide a peripheral interface of the type described which can function with a less complex and thus less expensive microprocessor.

It is yet a further object of the present invention to provide a peripheral interface of the type described which can be used to respond to a plurality of peripheral addresses.

To these ends, the peripheral interface of the invention includes means for stripping the address bit from the message received from the computer and for comparing the stripped address with its own address. The stripped message is saved and returned to the computer as part of a return message only if there has been a match detected between the received address and the address (or one of the addresses) of the peripheral.

To the accomplishment of the above and such objects as may hereinafter appear, the present invention relates to a peripheral interface substantially as defined in the appended claims and as described in the following specification as considered with the accompanying drawings in which:

Figure 1:
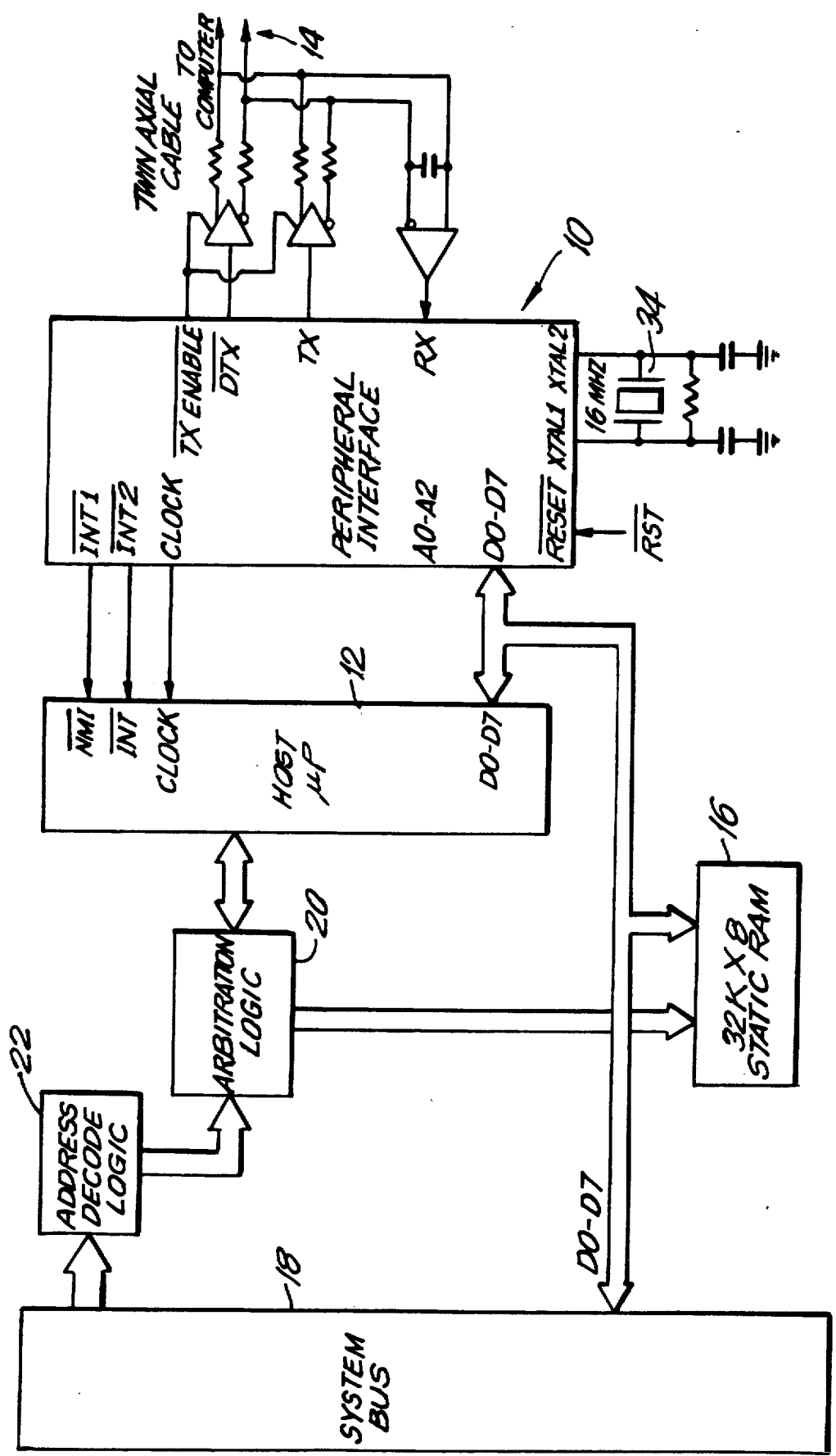
FIG. 1 is a schematic block diagram illustrating one application of the interface of the invention.

FIG. 1 illustrates one possible application of the controller or interface circuit of the invention. As therein shown, the interface of the present invention generally designated 10, is connected intermediate a central computer (not shown), which may be an IBM computer that transmits data to the Peripherals on an IBM twinaxial bus or cable in IBM 5250 protocol, and a host microprocessor 12 which is associated with a peripheral unit, such as a terminal or printer (not otherwise shown), it being understood that in a typical data communication network a plurality, typically up to seven, of different peripherals each having its own microprocessor and interface, are all connected for bilateral data communication with the computer.

As shown, interface 10 is connected to the computer by means of a cable 14, which, as noted, may be an IBM twinaxial cable. A static RAM 16 is connected both to the microprocessor 12 and to interface 10 as well as to a system bus 18. A per se conventional arbitration logic circuit 20 provides signals to the RAM 16 and receives and sends signals to the microprocessor 12. An also per se conventional address decode logic 22 decodes address and control signals from the system bus and provides read and write signals to the arbitration logic. As is per se conventional, data is communicated between the computer over the cable 14 to the peripheral via its associated microprocessor 12. The data communication between the computer and the peripheral is in the protocol associated with the computer and is bidirectional but only in one direction at a given time. That is, after the computer sends a message to a particular peripheral, the peripheral sends a message to the computer in response. When the computer sends a message destined to a particular peripheral, no other peripheral may respond to that message. The peripheral which finds a match between the three-bit address of the message and its own address (or one of its addresses) when responding, must include the same three bit address in the outgoing message. This is to allow the computer to do some form of checking and address verification.

Figure 6:
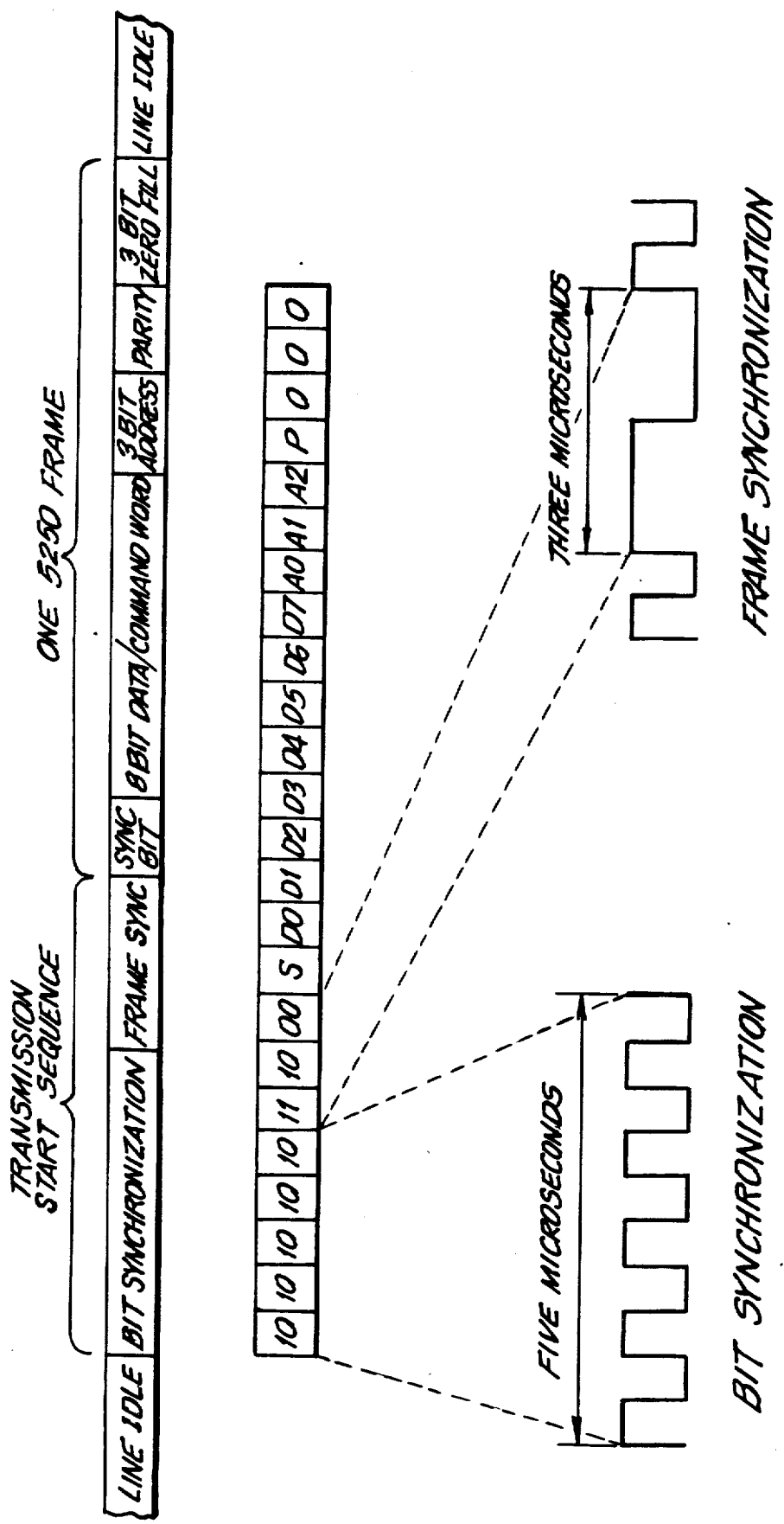
FIG. 6 is a diagram of a typical computer message format that can be processed by the peripheral interface of the invention.

In the exemplary embodiment of the invention herein described, the computer with which the interface 10 is designed to operate transmits messages in accordance with the protocol or format illustrated in FIG. 6. As therein shown, each message includes a 5-bit synchronization portion and a 3-bit frame synchronization portion, which together constitute the transmission start sequence of the message. The frame sync position is followed by a sync bit which is, in turn, followed in time sequence by an 8-bit data/command word, a 3-bit address, a parity bit and a 3-bit zero fill.

The computer can transmit messages, such as in the format illustrated in FIG. 6, to any one of the peripherals with which it is in network communication. Each of the peripherals is characterized or identified by a unique address, and the selection of the particular peripheral for which the message is directed is achieved in accordance with the particular 3-bit address contained in the message. It is the function of the interface 10 of the invention to facilitate communication between the central computer and the peripheral host microprocessor, particularly with respect to the manner in which the address information from the message received from the computer is processed, and in which the address data is inserted into the message sent from the peripheral to the computer.

Figure 2:
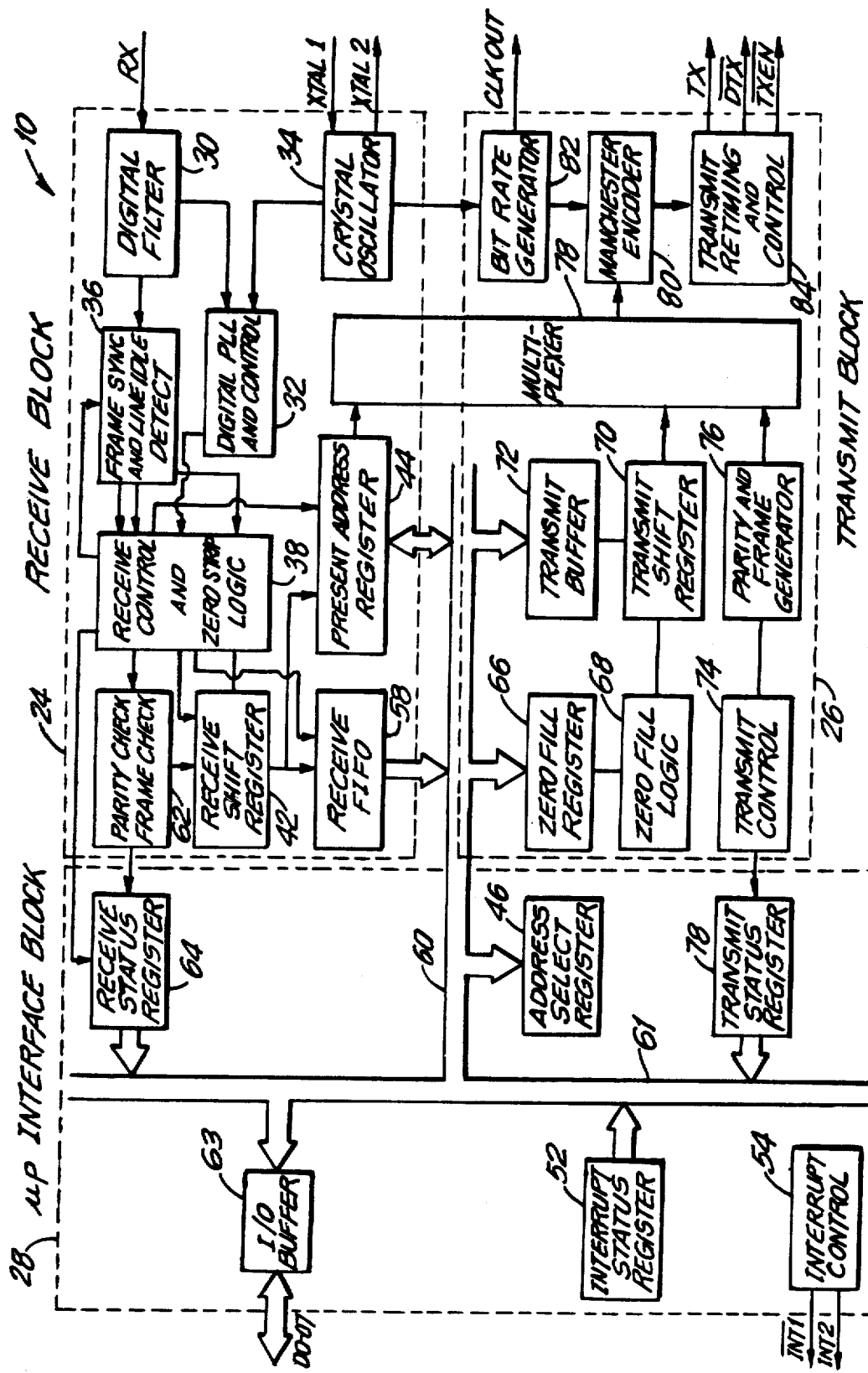
FIG. 2 is a schematic block diagram of the peripheral interface in accordance with an embodiment of the present invention.

As shown in FIG. 2, the interface 10 of the invention comprises a receive block 24, a transmit block 26 and a microprocessor interface block 28. A data signal RX is received by the receiver block 24 in a digital filter 30, which, in a per se conventional manner, removes or filters noise from the input signal.

The output of digital filter 30 is applied to a digital phase-locked loop and control circuit 32, which also receives a reference frequency signal, here shown as 16 MHz (FIG. 1) from a crystal oscillator 34. The digital phase-locked loop 32 separates the clock and data from the incoming data stream and generates synchronized clock and data. Several digital phase-locked loops are known and may be used in the circuit of the invention. The clock and data pulses generated by digital phase-locked loop 32 are applied to the remaining portions of the receive block.

The output of digital filter 30 is applied to a frame sync and line idle detect circuit 36, which detects the frame sync bits of the incoming message while ignoring the preceding bit synchronization portion of the message, and provides a filtered input signal to the digital phase-locked loop 32. A receive control and zero strip logic 38, described in greater detail below with reference to FIG. 7, receives the output of the frame sync detector 36. Circuit 36 also detects when there is no message activity on the line and generates a line idle signal to control circuit 38. Receive control logic 38, as described below, identifies the various subsections or portions of the message to determine the frame sync, data address and parity portions of the message and produces, as described below, an address time and parity signal at the occurrence of the corresponding address and parity bits of the message.

The address time signal generated in the control logic circuit 38 is applied to an eleven-stage receive shift register 42, in which the 8 data bits and three address bits of the message are stored. The three address bits of the received message which are stripped and initially stored in register 42, are transferred to and stored in a present address register 44.

In accordance with the present invention, the three-bit address stripped from the incoming message received from the computer in the manner just described is returned to the computer only if the peripheral with which the interface circuit of the invention is associated has to respond to the received message, that is, if there is a match between the three-bit received and stripped address and the address or one of the addresses of the peripheral stored in the address select register 46 that is included in the microprocessor interface block 28 of the interface circuit, and into which, according to a preferred embodiment of the invention, the reference address or addresses of the peripheral are written from the microprocessor.

In a data communication network that includes a plurality of attachments or peripherals each having its own unique address, stored in its address select register, each peripheral will receive a data message transmitted by the computer that is directed to one of these peripherals. Each of the peripherals that has an interface circuit of the invention as illustrated in FIG. 2 will receive that message, but only the one peripheral to which the message is directed will respond. All of the interface circuits will strip the three-bit address from the received message and store it in their respective present address register. However, since the stripped three-bit address will match for only one of the peripherals, the one to which the message is intended, only that peripheral will initiate the transmission of a return message to the computer. Significantly, and in contrast to the prior art, the microprocessor associated with that peripheral will not have to supply any address information to the outgoing message, since that information will be provided from the address information that was stripped from the received message and stored in the present address register 44 of the addressed peripheral's interface circuit.

Figure 3:
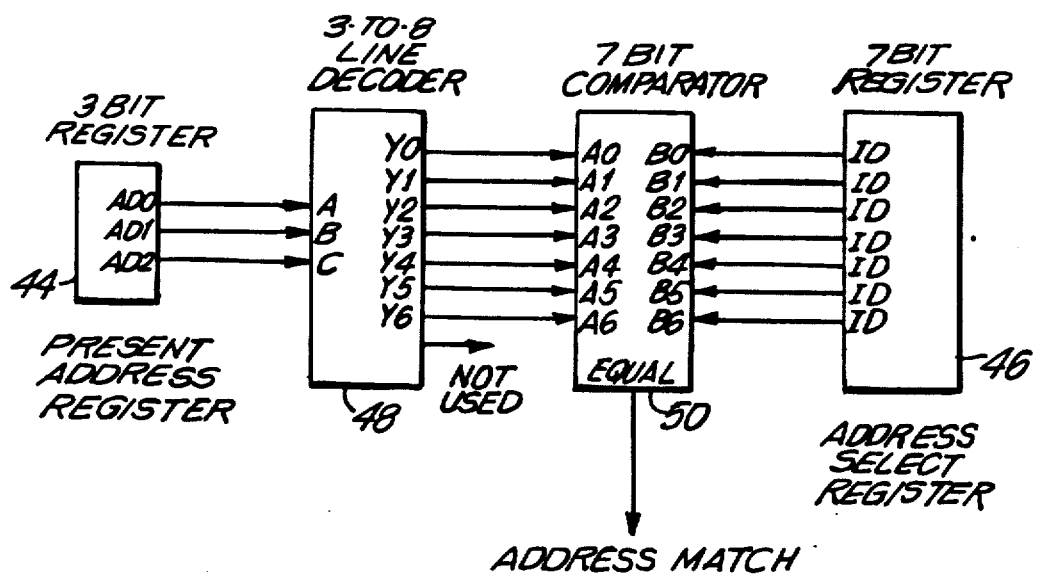
FIG. 3 is a block diagram of the address recognition circuit of the interface of FIG. 1.
Figure 4:
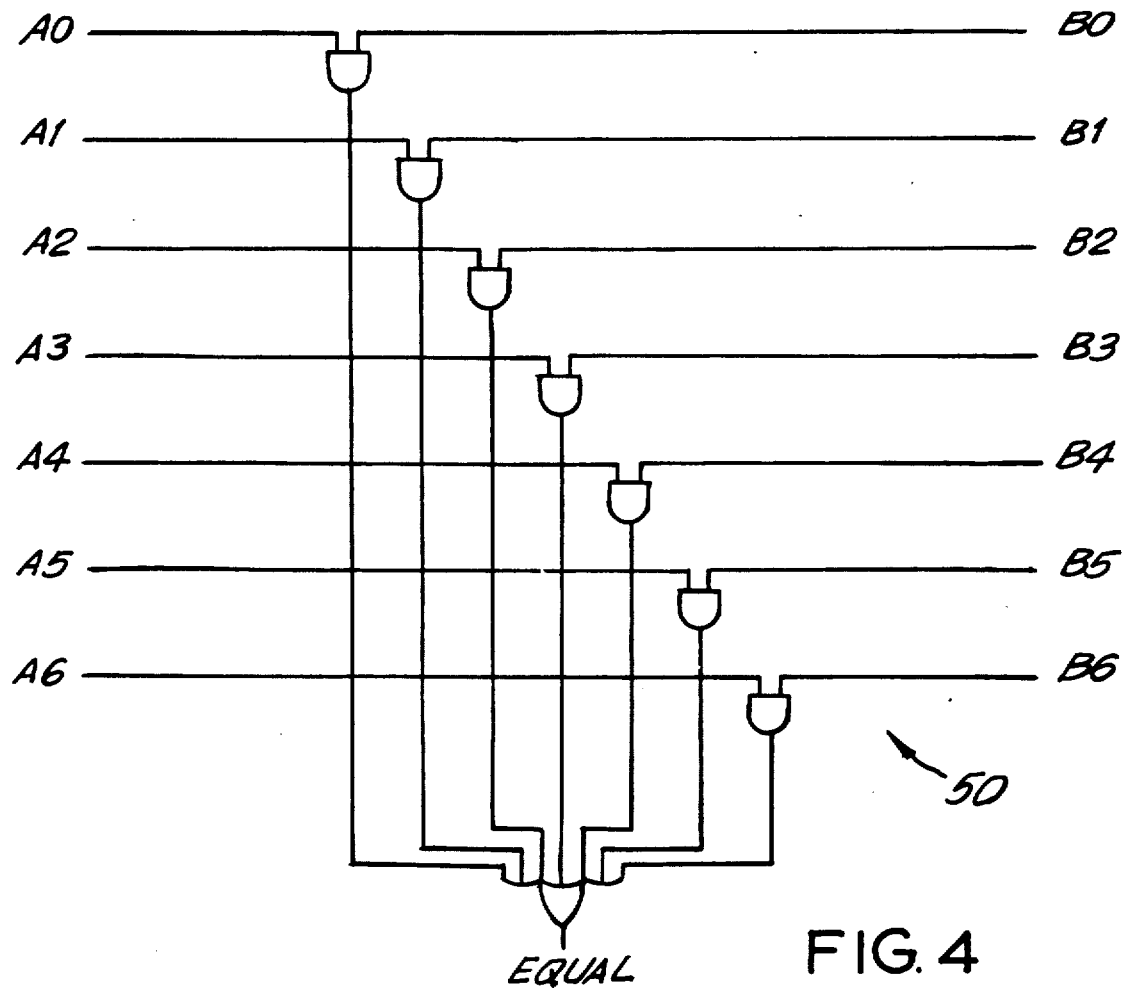
FIG. 4 is a schematic logic diagram of the comparator of FIG. 4.

To this end, as shown in FIG. 3, which illustrates the address recognition circuit in greater detail than in FIG. 2, the three-bit signal stored in the present address register 44 is applied to the inputs of a 3-to-8 line encoder 48 which converts the 3-bit address to a 7-bit address signal. That signal, in turn, is applied to the seven-bits (A0-A6) of a 7-bit comparator 50, illustrated in greater detail in FIG. 4, where it is compared to the contents of the address select register 46. To this end comparator 50 receives at its other set of inputs B014 B6. When a match is detected between any corresponding bits A and B in the comparator 50, an address match signal is generated at the output of the comparator.

In an alternate design contemplated by the present invention, the comparison of the contents may be read by the peripheral's microprocessor, which can then compare that address against the peripheral's address under the control of appropriate software in which the reference address is employed in the computer routine. When a comparison between the reference address and the address stripped from the received message is positive, e.g., when an address match signal is generated in comparator 50, that information is applied to the associated microprocessor.

If the result of the comparison of the address removed from the incoming message and the stored address is positive, as described above, the associated peripheral will analyze the data portion (bits D0-D7) of the received message frame and respond accordingly. That is, after the peripheral microprocessor receives the incoming message it will analyze it and perform an appropriate operation on the incoming data, e.g., send a message back to the computer.

If, on the other hand, the comparison is negative, the peripheral microprocessor ignores the entire message until a new message, which may include the peripheral's address is received from the computer.

Returning to the case in which the address comparison is positive, the address match signal places an address match bit in the interrupt status register 52 which causes an interrupt control 54 to send interrupt signals $\overline{INT1}$ or INT2 to the microprocessor. The interrupt signals when received at the microprocessor thus cause an interruption in the procedure or routine that is then being carried out at the peripheral microprocessor and, in accordance with the microprocessor's software control, causes the microprocessor to respond to the received message from the computer, which, in accordance with the positive address comparison mode, is directed for that particular peripheral.

Returning to the receive block 24 of the interface circuit of the invention, the data bits D0-D7 from the incoming message frame are removed from the incoming message frame and stored in one level of a two-level buffer register designated as the receive FIFO 58. The received data bits are applied through a bus 60 and a bus 61 and through an I/0 buffer 63 to the microprocessor. The receive control logic 38 also Provides the parity bit from the received frame to a parity check frame check 62 which compares the incoming parity bit with an internally generated parity bit (from the receive shift register 42) to determine the validity of the incoming message frame. The result of the parity check carried out in parity circuit 62 is stored in a receive status register 64. The bit stored in register 64 is sent to the microprocessor 12 via bus 61.

The function of the transmit block 26 of the interface circuit is to reconstitute a frame or message for transmission to the computer having the same protocol or standard as the received message frame illustrated in FIG. 6. To this end the microprocessor 12 transmits via buses 60, 61 to a zero fill register 66 the required number or count of the zero fill bits, here shown as three. That count is used to initialize a counter contained in a zero fill logic 68, which counts down and then transmits the zero fill bit to transmit shift register 70.

The shift register also receives the eight data bits to be included in the message to be transmitted from the addressed peripheral to the computer. Those data bits are received from the microprocessor 12 through buffer 63 and over buses 60, 61 to a transmit buffer 72 from which the data bits to be included in the transmitted message frame are applied to transmit shift register 70.

A transmit control 74 executes a procedure, as described below with reference to FIG. 2 and controls a parity and frame generation circuit 76, which generates the required frame sync, sync bit and parity bits transmit control also sends a status bit to a two-bit transmit status register 78, which stores that information and communicates it to the microprocessor to advise the latter of the readiness of the circuit to transmit a new message to the computer.

The outputs of the present address register 44 (three address bits of the peripheral), transmit shift register 70 (the zero fill and data bits), and the parity and frame generation circuit 76 (the frame sync , sync and parity bits) are combined in a multiplexer 78, when a message in the desired format and including the zero fill data is formed and employed to the input of a Manchester encoder 80. Encoder 80 receives timing or clock signals from a bit rate generator 82, which receives a clock signal from the crystal oscillator 34. The output of the encoder 80 is conveyed to a transmit-retiming and control circuit 84, which generates from the encoded signal it receives from the Manchester encoder 80, a true and a delayed inverted message signals TX and DTX, as well as the enabling signal $\overline{TXEN}$ which enables the drivers in the cable 14 as shown in FIG. 1, thereby to allow for transmission of the data message on cable 14 to the computer.

Figure 5:
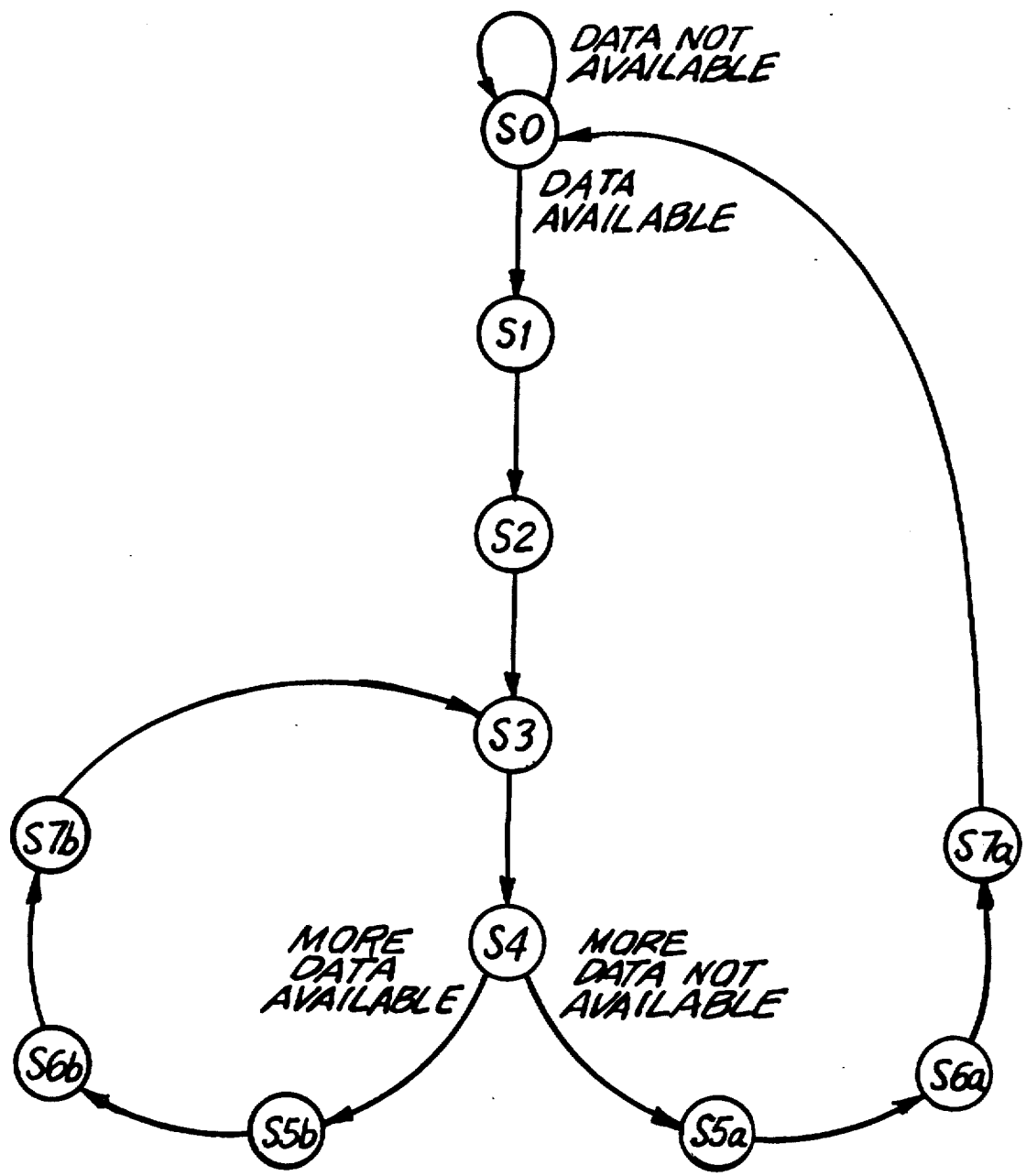
FIG. 5 is a flow diagram of the transmit control portion of the interface of FIG. 1.

Turning now to FIG. 5, there is shown in flow chart or flow diagram form the control sequence performed by transmit control 74 with respect to the transmission of a data message from the peripheral to the computer. In FIG. 5, the states (or collection of few states) are labeled with an "S" and certain states have two-way branches (decision) where an input condition is checked to determine the next state.

S0 is the idle state. Since it has two arrows coming out of this state, it is a decision-making state. The input condition checked is Data Available (meaning that data is to be transmitted because the external microprocessor has supplied new data). If data is available, then the sequences go to the next state (S1). If data is not available, go to S0 (meaning the next state is the same as the present state so that the transmit control is to keep checking for data available). This state is one clock long.

S1 is the transmit five ones state. The five one's (1's) of the transmit start or bit synchronization sequence are transmitted in this state. This state is five clocks long. S2 is the transmit frame sync pattern state. The frame sync pattern of the transmit start sequence is transmitted in this state. This state is three clocks long. S3 is the transmit sync bit state. The sync bit (a one) is transmitted in this state. This state is one clock long.

S4 is the transmit data state. The eight data bits (D0-D7) are transmitted in this state. At the end of the last data bit (D7) a decision is made based on data available to determine the next state. If more data is available, then the three bits of the present address register 44 are transmitted. If no more data is available, then an end of message (111) signal is transmitted. This state is eight clocks long. If no more data is available, the sequence goes to the S5a state which is the transmit end of message (111) state during which the 111 pattern is transmitted. The S5a state is three clocks long.

The sequence then goes to the S6a state which is the transmit parity state during which the parity bit of the frame is transmitted. This state is one clock long. The next state is S7a which is the transmit three zero bits state during which the three zero bits of the frame are transmitted. At the conclusion of this state, the sequence goes to state S0 and the entire process is repeated. The S7a state is three clocks long.

If, on the other hand, more data is available for transmission to the computer, the sequence from state S4 goes to the S5b state, which is the transmit present address state during which the three bits of the present address register 44 are transmitted. This state is three clocks long.

The next state is the routine S6b which is the transmit parity state, during which the parity bit of the frame is transmitted. This state is one clock long. S7b is the transmit zero bits state during which the three zero bits of the frame along with the interframe zero fill bits are transmitted. At the conclusion of this state, the routine or sequence goes to state S3 and transmits the next frame. This state is three plus clocks long depending on the number of zero fill bits transmitted.

Figure 7:
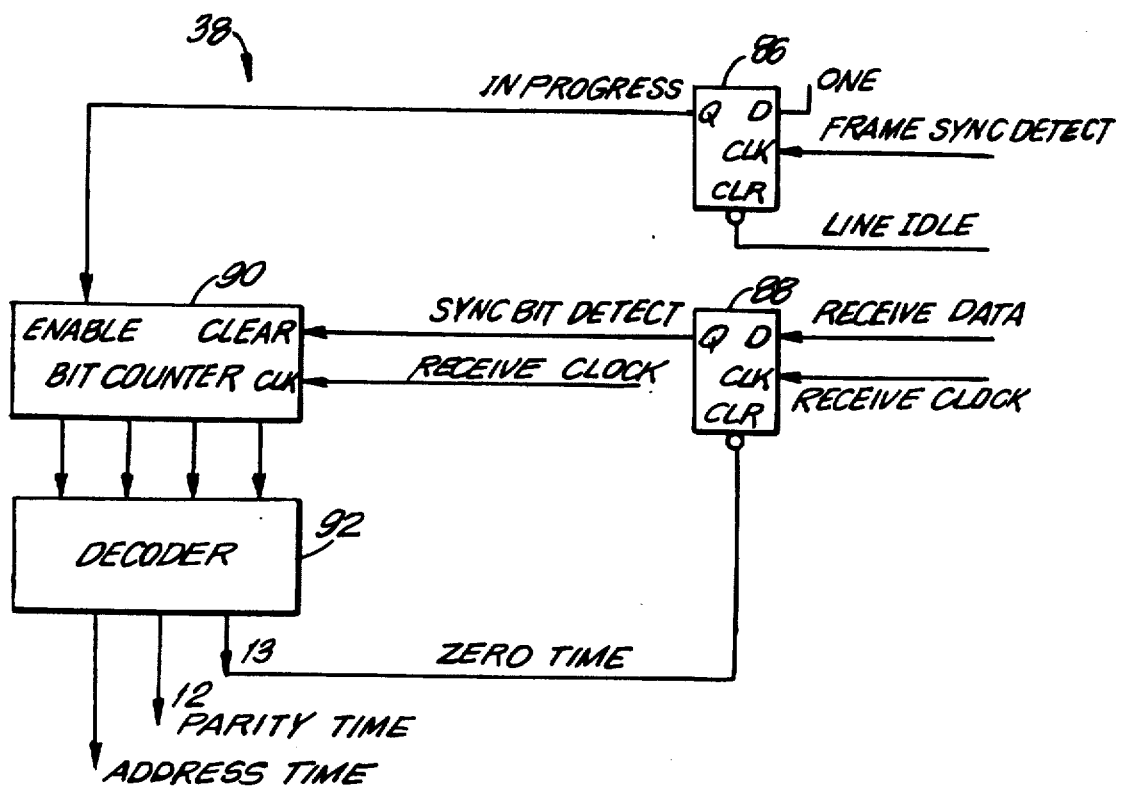
FIG. 7 is a schematic block diagram of the receive control and zero strip logic circuit of the peripheral interface of FIG. 1.

As shown in FIG. 7, the receive control circuit 38 includes an in-progress flip-flop 86 which receives a frame sync detect signal at its CLK input from the frame sync detect circuit 36. Flip-flop 86 also receives the Line Idle signal from circuit 36 at its inverted CLR input and a logic "1" at its D input. The output of flip-flop 86 at its Q terminal is the In-Progress signal.

Also included in receive control circuit 38 is a sync bit detected flip-flop 88, which receives the Receive Data and Receive Clock signals from the digital phase-locked loop 32. The Receive Data signal is applied to the D input and the Receive Clock signal is applied to the CLK input of flip-flop 88. The output of flip-flop 88 at the Q terminal is the Sync Bit Detect signal.

The In-Progress signal from flip-flop 88 and the Sync Bit Detect signal from flip-flop 88 are respectively applied to the enable and clear inputs of a bit counter 90, which also receives the Receive Clock signal at its CLK input. The outputs of the counter are applied to a decoder 92, which receives and decodes the outputs of the bit counter 90 and produces the Address Time, Parity Time, and Zero Time Signals. The latter is applied to the inverted CLR terminal of flip-flop 88.

Flip-flop 86 produces an In-Progress signal to enable the bit counter 90 upon the detection of a frame sync, which occurs when a message packet reception process is occurring. When the message is terminated or when there is no message activity on the line, the Line Idle signal clears flip-flop 86 and removes the In-Progress signal. The Sync Bit Detect signal produced in flip-flop 88 clears bit counter 90 as an indication of the beginning of a new message frame so as to cause bit counter 90 to start counting from an initial count.

The counting operation of bit counter 90, which counts the number of bits within a received message frame, begins when a sync bit is detected. Bit counter 90 continues to count until the count of 13 is reached at which time a Zero Time signal is produced; that signal is, as noted, applied to the inverted CLR terminal of flip-flop 88 to remove the Sync Bit Detect signal from the CLR terminal of the bit counter 90, to cause bit counter 90 to stop counting, and to remain doing so until a new frame sync bit is detected.

During the counts of 1 through 8 of bit counter 90 the interface receiver is receiving the eight data bits D0-D7 of the message frame; during the counts of 9-10-11, the receiver is receiving the address bits A0-A2; at the count of 12 it is parity time during which the receiver is receiving the parity bit P; and a count of 13 is zero time. To this end, the count in bit counter 90 is decoded in decoder 92, which generates an Address Time signal for a detected count of 9, 10 or 11, a Parity Time signal for a count of 12, and a Zero Time signal for a count of 13.

During the count of 1 through 8, no signal is produced by decoder 90 which causes the eight data bits to be transferred to the 8-bit section of receive shift register 42. During the Address Time, which occurs the next 3 counts, the three address bits are transferred and stored in the other 3-bit section of receive shift register 42, as described above. The Parity Time signal is applied to parity check circuit 62, and, as described, the Zero Time signal is returned to the flip-flop 88 to thereby carry out the zero strip logic function in circuit 38.

It will be appreciated from the foregoing description of a preferred embodiment that the peripheral interface of the invention provides improved communication between a computer and a peripheral. It will further be appreciated that modifications to the described embodiment may be made without necessarily departing from the spirit and scope of the appended claims.

What is claimed is:

1. An interface arrangement for use in facilitating serial data communication between a computer and a plurality of peripherals located remote from the computer, a plurality of interfaces in respective operative association with each of said peripherals, each of said peripherals being assigned a plurality of unique peripheral addresses, wherein a data message including a plurality of data frames is transmitted from the computer to one of said peripherals, each of said data frames including identification address data uniquely associated with the peripheral to which the data message is directed, at least one of said interfaces including means for receiving and separating the identification address data from each frame of the received serial data message, means for storing said unique peripheral addresses, means coupled to said separating means and to said peripheral address storing means for storing the separated identification address data, means for comparing the separated identification address data and the stored peripheral addresses, means coupled to said separated address data storing means for combining the separated identification address data with each data frame of the data message to be transmitted serially at a later time by the peripheral when said comparing means detects said predetermined relation between the separated identification address data and the stored peripheral identification addresses, and means responsive to said comparison for instructing the peripheral associated with said at least one interface to respond to the received data message at a later time when the separated identification address data bears a predetermined relation to the stored peripheral addresses.

* * * * *